United States Patent
Shen et al.

(10) Patent No.: US 9,396,186 B2
(45) Date of Patent: *Jul. 19, 2016

(54) CUSTOMIZABLE AND LOW-LATENCY INTERACTIVE COMPUTER-AIDED TRANSLATION

(71) Applicant: INTERNATIONAL BUSINESS MACHINES CORPORATION, Armonk, NY (US)

(72) Inventors: Libin Shen, Millwood, NY (US); Bowen Zhou, Somers, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 237 days.

This patent is subject to a terminal disclaimer.

(21) Appl. No.: 14/030,637

(22) Filed: Sep. 18, 2013

(65) Prior Publication Data

US 2014/0288914 A1    Sep. 25, 2014

Related U.S. Application Data

(63) Continuation of application No. 13/847,288, filed on Mar. 19, 2013.

(51) Int. Cl.
*G10L 17/00* (2013.01)
*G06F 17/28* (2006.01)
*G10L 17/22* (2013.01)

(52) U.S. Cl.
CPC .......... *G06F 17/289* (2013.01); *G06F 17/2836* (2013.01); *G10L 17/22* (2013.01)

(58) Field of Classification Search
CPC .... G06F 17/289; G06F 17/2836; G10L 17/22

USPC ............................................................ 704/2
See application file for complete search history.

(56) References Cited

U.S. PATENT DOCUMENTS

| 6,393,389 | B1 | 5/2002 | Chanod et al. |
| 7,124,073 | B2 * | 10/2006 | Tokuda et al. ................... 704/2 |
| 7,383,542 | B2 | 6/2008 | Richardson et al. |

(Continued)

FOREIGN PATENT DOCUMENTS

WO    WO02/073464 A1    9/2002

OTHER PUBLICATIONS

International Search Report and Written Opinion of the International Searching Authority. Issued for International Application No. PCT/US14/31179. Mar. 2014. (9 Pages).

(Continued)

*Primary Examiner* — Daniel Abebe
(74) *Attorney, Agent, or Firm* — Tutunjian & Bitetto, P.C.; Jennifer R. Davis

(57) ABSTRACT

Computer-aided translation systems include a processor configured to generate a suggestion pool of possible translations for each sentence in a document that has one or more sentences to be translated; a translation module configured to provide a best suggestion from the suggestion pool to a user for a sentence being translated and to provide an updated best suggestion from the updated suggestion pool to the user for the sentence being translated after the receipt of a user's translation prefix input; and a pool update module configured to update the suggestion pool based on the user's input of a translation prefix.

12 Claims, 5 Drawing Sheets

(56) References Cited

U.S. PATENT DOCUMENTS

| | | | |
|---|---|---|---|
| 2001/0029455 A1 | 10/2001 | Chin et al. | |
| 2009/0319257 A1* | 12/2009 | Blume et al. | 704/7 |
| 2011/0184719 A1 | 7/2011 | Christ | |
| 2012/0072203 A1 | 3/2012 | Chiu et al. | |
| 2012/0330990 A1 | 12/2012 | Chen et al. | |
| 2013/0173247 A1* | 7/2013 | Hodson | 704/4 |

OTHER PUBLICATIONS

Ajax Patterns. "Suggestion" Ajaxpatterns.org. Last modified Feb. 2010. (8 Pages) Available at http://ajaxpatterns.org/Suggestion.

Barrachina, S., et al. "Statistical Approaches to Computer-Aided Translation" Computational Linguistics, vol. 35, No. 1. Dec. 2007. pp. 3-28.

Koehn, P. "A Web-Based Interactive Computer-Aided Translation Tool" Proceedings of the ACL-IJCNLP 2009 Software Demonstrations. Aug. 2009. pp. 17-20.

Koehn, P. "Welcome to Caitra" Caitra.org. Last modified Apr. 2012. (1 Page) Available at http://www.caitra.org/.

Langlais, P., et al. "Transtype: A Computer-Aided Translation Typing System" Proceedings of the ANLP-NAACL 2000 Workshop on Embedded Machine Translation Systems. May 2000. pp. 46-51.

* cited by examiner

CUSTOMIZABLE AND LOW-LATENCY INTERACTIVE COMPUTER-AIDED TRANSLATION

RELATED APPLICATION INFORMATION

This application is a Continuation application of co-pending U.S. patent application Ser. No. 13/847,288 filed on Mar. 19, 2013, incorporated herein by reference in its entirety.

BACKGROUND

1. Technical Field

The present invention relates to computer-aided translation and, more particularly, to computer-aided translation that adapts to a user's translation selections.

2. Description of the Related Art

Fully machine-based translation is used to automatically generate a translation. This may be useful for users who are not acquainted with the language in question and who do not have the resources or time to employ a skilled translator. However, machine translation (MT) provides unreliable translations due to the complexity of language. For example, a given sentence in a first language may have multiple different meanings and may therefore have multiple different translations in a second language.

Computer-aided translation (CAT) attempts to find the best of both worlds, with the speed of MT and the human judgment of a skilled translator. MT is used to generate suggested translations within a document, and a human translator accepts or modifies the suggestions. In this way, whenever the MT suggestion is accurate, the translator is relieved of the burden of replicating that work and translation productivity may be increased.

However, translation suggestions provided by general MT systems are often not helpful for CAT when dealing with specific domains, where words may have non-standard meanings or may be applied in a non-standard way. In such a scenario, the suggestions will be consistently inaccurate, saving little time for the translator. Furthermore, the latency of MT may cause additional delays that limit translation productivity.

SUMMARY

A method for computer-aided translation includes receiving a document comprising one or more sentences to be translated; generating a suggestion pool of possible translations for each sentence in the document using a processor; providing a best suggestion from the suggestion pool to a user for a sentence being translated; updating the suggestion pool based on the user's input of a translation prefix; and providing an updated best suggestion from the updated suggestion pool to the user for the sentence being translated.

A method for computer-aided translation includes receiving a document comprising one or more sentences to be translated; generating a suggestion pool of possible translations for each sentence in the document at a server device using a processor, based on general and customized translation models having in-domain translation data; transmitting the suggestion pool to a client device; providing a best suggestion from the suggestion pool to a user for a sentence being translated; transmitting a request for additional possible translations based on the translation prefix if the prefix deviates from possible translations in the suggestion pool; updating the suggestion pool based on the user's input of a translation prefix; and providing an updated best suggestion from the updated suggestion pool to the user for the sentence being translated.

A computer-aided translation system includes a processor configured to generate a suggestion pool of possible translations for each sentence in a document that comprises one or more sentences to be translated; a translation module configured to provide a best suggestion from the suggestion pool to a user for a sentence being translated and to provide an updated best suggestion from the updated suggestion pool to the user for the sentence being translated after the receipt of a user's translation prefix input; and a pool update module configured to update the suggestion pool based on the user's input of a translation prefix.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide computer-aided translation (CAT) by providing real-time and interactive translation suggestions that rapidly adapt based on a translator's intentions and translation inputs. A translator is able to accept a partial translation prefix and begin manually translating at any point in a sentence. The present embodiments provide updated suggestions based on the manual inputs, allowing the translator to benefit from CAT even after an initial suggestion is rejected. This increases both the speed and accuracy of translation suggestions in CAT. Furthermore, domain-specific data and/or dictionaries may be used to customize suggestions. It should be recognized that embodiments of the present invention may be applied equally to computer aided transcription, where audio or video information is reviewed by a human transcriber and with suggestions generated by voice recognition software.

Figure 1:
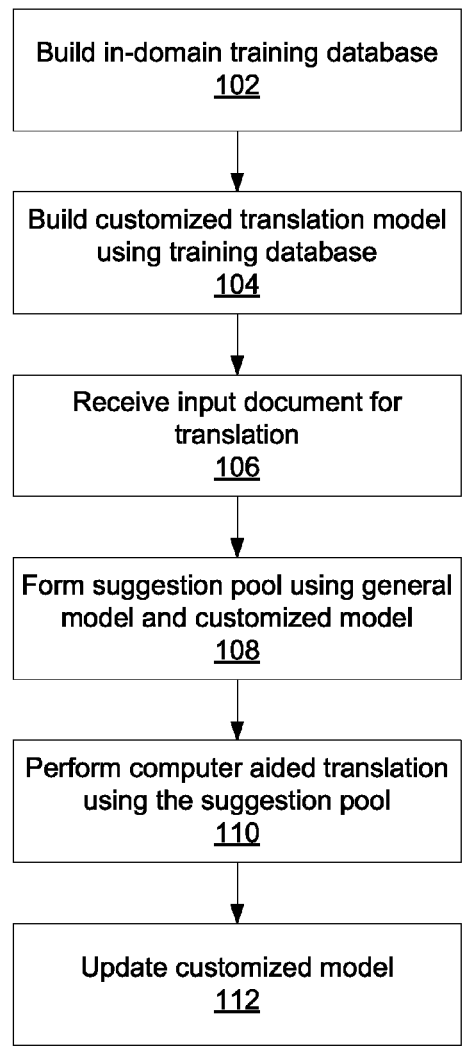
FIG. 1 is a block/flow diagram of a method for computer-aided translation (CAT) in accordance with an embodiment of the present invention.

Referring now to the drawings in which like numerals represent the same or similar elements and initially to FIG. 1, an overview of present embodiments for CAT is shown. Block 102 builds an in-domain training database. Such a database may be organized as parallel phrase pairs. Each phrase pair includes two sentences, one in the source language and the other in the target language. In the case of translating or transcribing spoken language, the information will include voice recognition information in addition to linguistic content. Parallel phrase pairs are generally created by human translators, but they may come from any suitable source.

Block 104 builds a customized translation model using the translation database. This customized translation model provides a set of knowledge that a computer can use to make inferences and decisions regarding potential translations and may include both a translation model and a natural language model. The customized translation model is a statistical model that learns from the training database. Any appropriate learning method may be employed including, e.g., word-based, phrase-based, tree-based, generative, discriminative, and heuristic methods. This list is not intended to be exhaustive, and those having ordinary skill in the art will be capable of selecting an appropriate learning model for a given application.

Block 106 receives an input document for translation. The input document is in a first language and is to be translated to a second language. The language of the input document may, e.g., be identified explicitly by an operator, be designated in the document itself, or be determined automatically by natural language recognition. It should be recognized that the document itself need not be a text document, but may also include audio or video information. For example, when coupled with a voice recognition system, CAT may be used to aid a translator in transcribing spoken language.

Block 108 forms a suggestion pool for translation. The suggestion pool is based on one or more customized translation models as well as general translation models and may include, for example, a word lattice, a list of n-gram strings, a pre-fix tree, etc., and may be searchable by the client-side of the CAT tool. A general translation model may be, for example, a model that handles common phrases within the languages in question, while the customized translation model may provide specialized vocabulary and usage that is specific to a specific domain. Such a general model may include, for example, all the translation models, language models, reordering models, etc., that are used in statistical machine translation.

The domain, as well as the corresponding customized translation model, may be selected by the user or may be automatically determined by the system based on, for example, a frequency count of words or phrases within the document that is associated with a particular domain. For example, if the document includes many words or phrases relating to automobiles, the CAT tool may suggest to the human translator a customized translation model belonging to an automotive domain. Any number of customized models may be used, as a given document may belong to multiple domains. In one exemplary embodiment, the document itself will have explicit domain information provided by an entity submitting the document for translation. The CAT tool may read this information and automatically load whatever customized translation models are called for.

The general translation model and the customized translation model(s) may be combined according to any appropriate method. For example, the two models may be simply added to one another, with optional weights controlling how strongly contributions from each model are to be considered. Alternatively, a machine translation may be performed using the general model first, after which the customized model maybe used to re-rank translations, picking those which are most suitable for the targeted domain(s). In a further embodiment, the CAT system need not combine the two models at all. Each model may generate candidate translations that are added to the suggestion pool. The sets of candidate translations may be combined, with redundancies between similar or identical translations removed. Translation confidence scores may be used as weights when building such a compact representation. The resulting suggestion pool is made up of a set high-probability translations. As will be described in more detail below, this allows a local translation tool to provide suggestions with low latency, as modifications can be made to the suggestion pool without requesting more information from a translation server over a slow network.

Block 110 performs CAT using the suggestion pool. Toward this end, the CAT system provides translation suggestions for each sentence in the input document. The translator may accept the translation, at which point a next sentence is considered translated. The user may also accept a partial translation, for example if the prefix of the sentence is correctly translated, but the remainder of the sentence is incorrect. If the translator does not accept the translation, or accepts a partial suggestion, the translator begins to enter an updated translation. The CAT system may provide updated suggestions as the translator continues to provide more information, which serves to reduce the number of possible translations and allows the CAT system to refine its suggestions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 2:
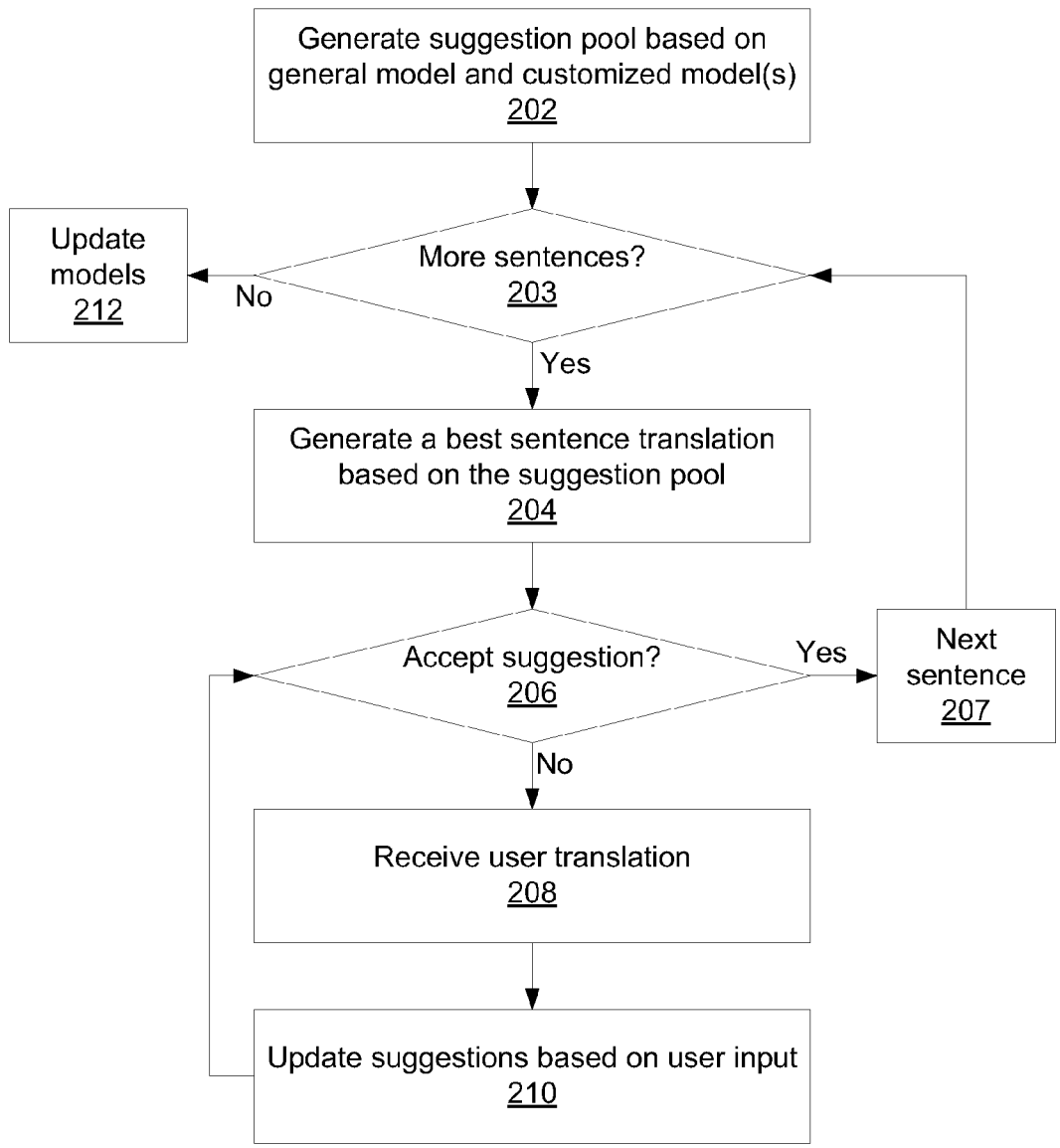
FIG. 2 is a block/flow diagram of a method for CAT in accordance with an embodiment of the present invention.

Referring now to FIG. 2, a method for providing and updating suggestions in CAT is shown. Block 202 generates a suggestion pool as described above. The suggestion pool is based on a general translation model and one or more customized translation models. Block 203 determines whether there are untranslated sentences in the input document. If so, block 204 generates a best sentence translation for a first untranslated sentence in the input document using the suggestion pool. This best sentence may be one of several possible sentence translations and may be selected according to any appropriate method. For example, each potential translation may be assigned a confidence score that corresponds to a likelihood that the translation is correct. The suggestion that is determined to be the most likely translation is presented to the translator for acceptance.

At block 206, the translator has the option of accepting or rejecting the suggestion. The user may make this choice using, e.g., a keyboard shortcut, to make the acceptance or rejection as efficient as possible. If the translator accepts the suggestion, block 207 selects the next sentence in the input document and returns processing to block 203, which determines whether there are any remaining sentences. If the translator rejects the suggestion or accepts only part of the suggestion, the translator may begin entering a translation at block 208. If the translator accepted a partial suggestion, then the translator begins entering translated information at the end of the accepted prefix.

As the user enters information, block 210 updates the suggestions. The CAT system matches the prefix against the suggestion pool. If there are matches, the next few words after the matched prefix in candidate translations are suggested. When the system reads more input from the user, the user's translation limits the number of possible suggestions and may make a new suggestion the most likely translation for the sentence. Block 210 displays the new suggestion and allows the user to accept the suggestion at block 206. The user may continue to enter the translation, which implicitly rejects the new suggestion. This continues until the translator either completes the sentence translation manually or accepts a translation suggestion. Each sentence in the input document is processed in this fashion until the entire document has been translated.

Once block 203 determines that no sentences remain, block 212 may optionally update the customized translation model (s) using additional sentence pairs learned during translation. This update may include updating the entire model or may only be an update of the weights of parameters in the model. Block 212 may perform this update at any time but, because such an update can be time consuming and computationally intensive, updating the model offline may be most efficient. Alternatively, incremental updates to the model may be performed online in the background. This allows the CAT system to adapt to particular vocabulary and usage found within the document.

Figure 3:
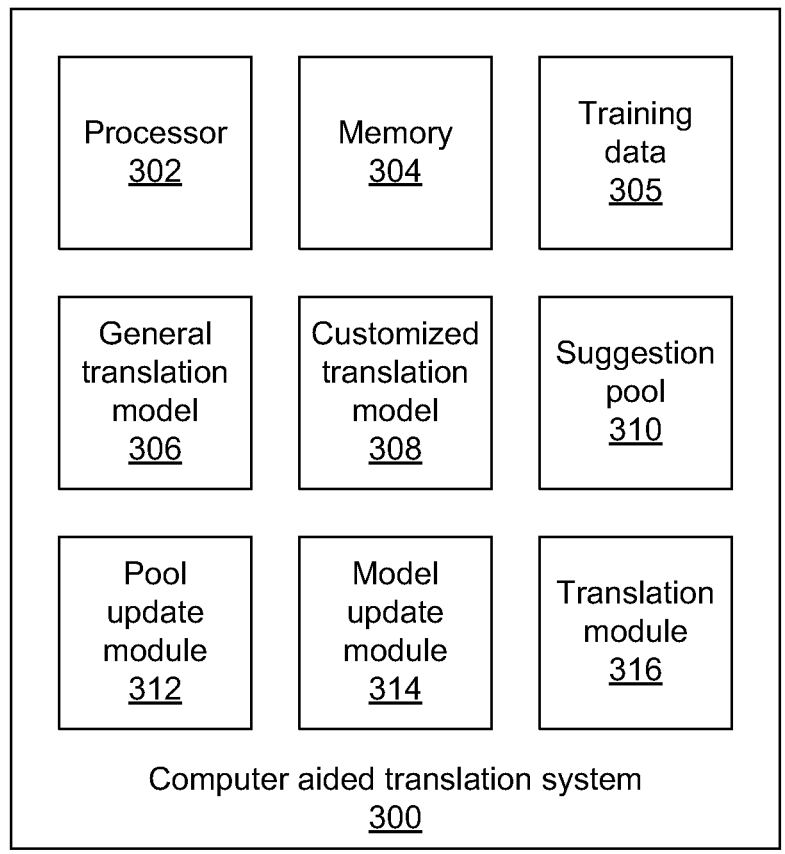
FIG. 3 is a diagram of a system for CAT in accordance with an embodiment of the present invention.

Referring now to FIG. 3, a CAT system 300 is shown. The system includes a processor 302 and a memory 304. Training data stored in memory 304 is used by model update module to create and update one or more customized translation models 308, to be stored in memory with a general translation model 306. Pool update module 312 uses processor 302 to generate a suggestion pool 310 for sentences in the input document using the general and customized translation models 306 and 308. The translation module 316 uses the processor 302 to review suggestion pool 310 and to provide translation suggestions for sentences in an input document. The translation module 316 receives user inputs and reassesses the suggestions in suggestion pool 310 adaptively, providing updated suggestions as the user's inputs foreclose translations options. A model update module 314 uses processor 302 to update the customized translation module 308 using the information received by the user's translations.

Although the diagram depicts a single system 300, it should be noted that the functional modules shown need not all be implemented in a single piece of hardware. For example, the customized translation model may be generated, stored, and updated at a server device and only transmitted to a translator's client device as needed.

Figure 4:
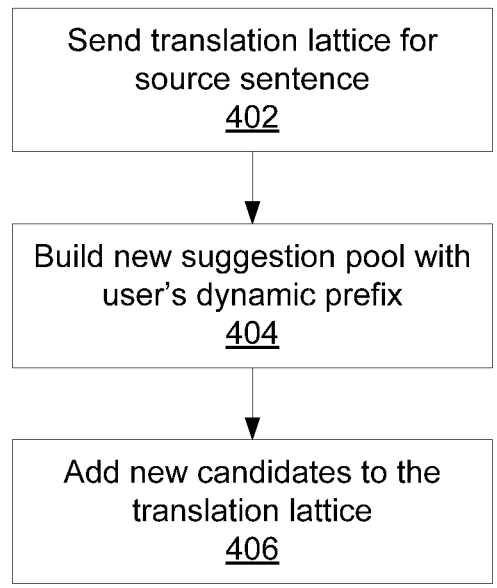
FIG. 4 is a block/flow diagram of a method for suggestion pool updates in accordance with an embodiment of the present invention.

Referring now to FIG. 4, additional detail on updating the suggestion pool in block 210 is provided. Block 402 creates a suggestion pool that includes, e.g., a pruned translation lattice that compactly represents a set of possible phrase translations of a source sentence and sends that sentence to a translator. As the translator changes the translation prefix, block 404 builds a new suggestion pool. Block 406 adds any new candidates to the translation lattice and prunes any candidates that are no longer viable. Because a translation lattice encodes the most likely translations, but does not necessarily include all possible translations, the lattice is updated to reflect changes to the most likely translations based on the inputs provided by the translator.

Block 406, in pruning the possible translations, makes a likelihood determination for each possible translation. A threshold is used to determine whether a given possible translation will be placed in the suggestion pool, such that translations with a likelihood over the threshold are used in the pool and translations below the threshold are pruned from the pool. This likelihood can be generated by any appropriate mechanism using, e.g., word commonality, document context, etc., to generate a score for each translation. Block 406 may also ask the server for additional candidates based on a user's prefix, adding those additional candidates to the suggestion pool.

Figure 5:
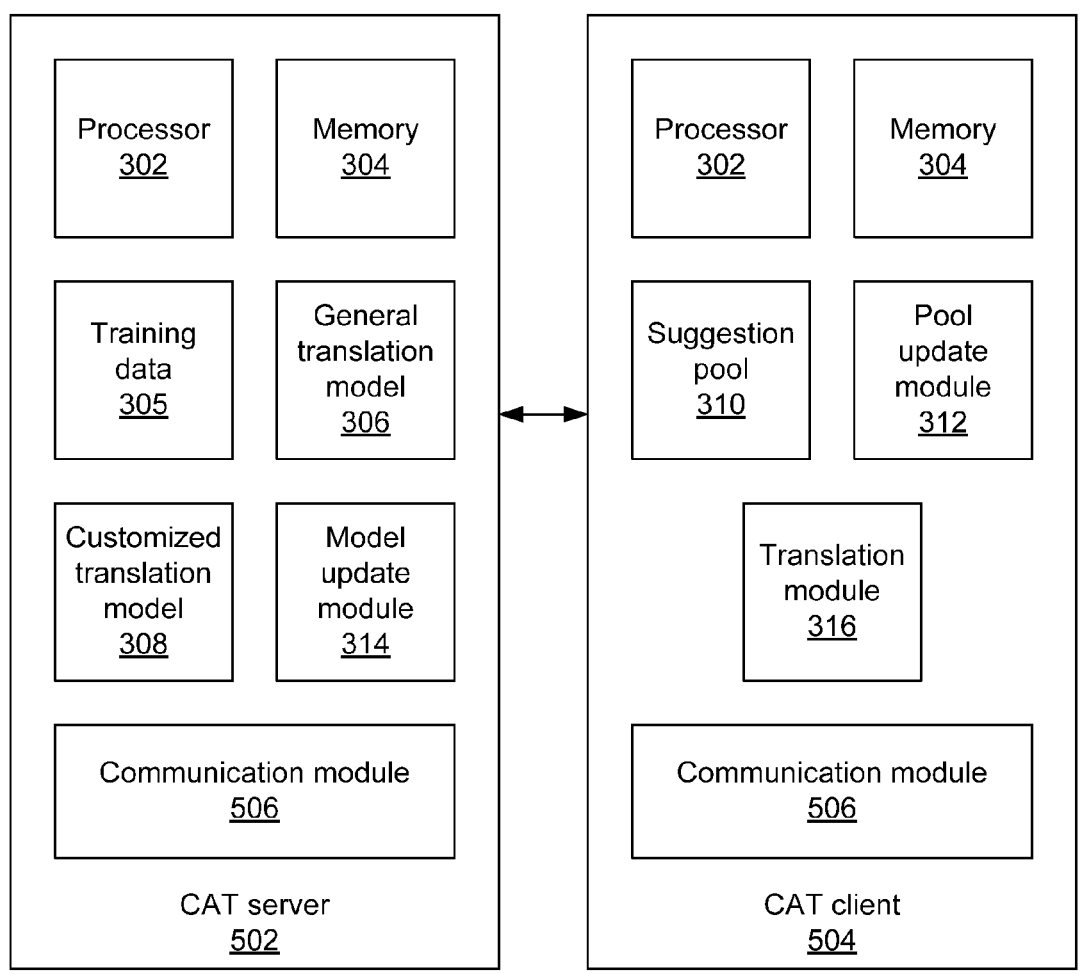
FIG. 5 is a diagram of a server/client system for CAT in accordance with an embodiment of the present invention.

Referring now to FIG. 5, a client/server embodiment of the present invention is provided. A server 502 generates the pool and sends that pool to a client 504 in block 402. The server 502 and client 504 each have a communication module 506 to facilitate communications. As noted above, the suggestion pool may be a subset of all the possible translations. For example, if a given sentence has twenty possible translations, the suggestion pool may only include the best ten translations. Alternatively, the suggestion pool may include those translations that have a likelihood above a threshold.

As a translator accepts or rejects proposed translations, the client 504 uses the suggestion pool to generate new proposed suggestions without needing to ask the server 502. In particular, if the user accepts a translation prefix, the client 504 refers to other potential translations in the suggestion pool that share that prefix. The size of the suggestion pool represents a tradeoff between memory usage at the client 504 and the latency of communications between the server 502 and the client 504. A larger suggestion pool means that the client 504 will need to ask the server for an updated pool less often, but being prepared for unexpected translations comes at the cost of increased memory usage.

In this exemplary embodiment, the server 502 includes the training data 305 and translation models 306/308, along with the model update module 314 that uses information from the client 504 to provide further refinements on the customized translation model 308. The server 502 uses this information to generate and transmit a suggestion pool 310, which is stored at the client 504 and which is used by translation module 316 to aid a translator. The communication modules 506 may operate using any appropriate medium, including the Internet, a local area network, a wireless network, etc. In one example, the client 502 may be a desktop computer running the translation module 316 in a web browser.

Figure 6:
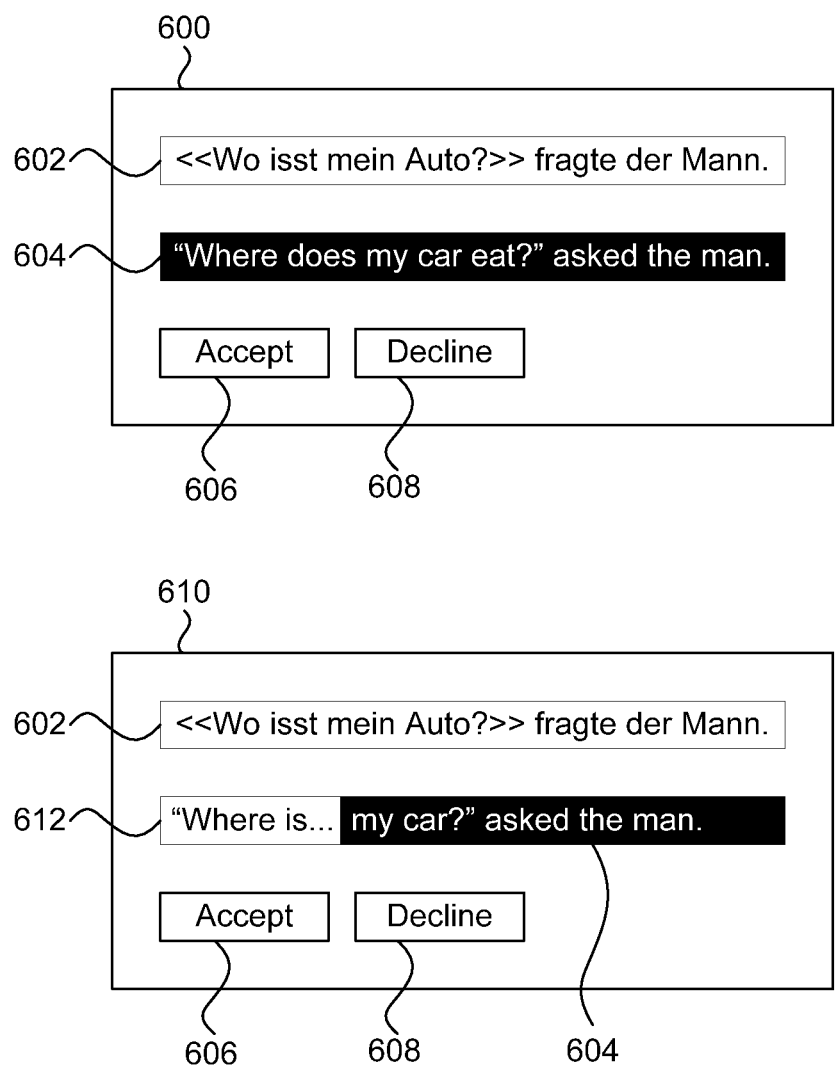
FIG. 6 is a diagram illustrating an exemplary translation user interface in accordance with an embodiment of the present invention.

Referring now to FIG. 6, an exemplary translation dialog is shown. A user interface 600 displays a sentence to be translated 602 and the best machine-generated translation 604. An accept button 606 and a decline button 608 allow the user to accept or reject the proposed translation 604. In the present case, the source phrase 602 has a misspelling (the German word "ist," meaning "is," is misspelled as the word "isst," meaning, "eats"), causing the machine translation to generate an absurd proposed translation 604. The translation 604 is literally correct, but the translation models 306/308 may not be able to detect the absurdity of the proposal. The translator may select the decline button 608, which would cause the dialog box 600 to display the next-best possible translation from the suggestion pool 310.

A human translator would naturally understand the error in the present example and attempt to correct the mistake. As such, the translator could decline the proposed translation 604 entirely. However, the proposed translation 604 does begin correctly, and the translator may elect to use the correct portion in building an accurate translation. The translator therefore begins at a desired point in the proposed translation 604, causing dialog box 610 to update. Now a prefix 612 exists that includes an accepted portion of the original proposed translation 604 (in this case, "'Where') and the word "is" entered by the user. The client 504 running the user interface 610 updates the suggestion pool 310 and proposes a new best translation 604.

If the prefix 612 deviates from the possibilities present in the suggestion pool 310, the client 504 sends a request to server 502 for additional possible translations and rebuilds the suggestion pool 310. This may occur if the translator judges the translations in the suggestion pool 310 are far from the mark, based on the context of the entire document, but may also occur if the translator simply wants to, for example, restructure the sentence. As noted above, such a request to the server 502 will increase the latency of providing a new proposed translation 604.

The dialog box 610 graphically distinguishes between the translation prefix 612 and the proposed translation 604. In the present embodiment this is accomplished by highlighting the proposed translation 604 and rendering the translation prefix 612 in plain text, but it should be understood that any appropriate distinction could be used. Based on the context of the text and the translator's facility with the two languages in question, the translator determines that the new proposal 604 accurately reflects the intended translation of the source sentence 602. As such, the translator now presses the accept button 606 and proceeds to the next sentence in the document. The translator need not use the buttons 606/608 at all, and may instead use keyboard shortcuts or may simply translate the entire sentence manually.

Having described preferred embodiments of a system and method for customizable and low-latency interactive computer-aided translation (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-aided translation system, comprising:
a processor configured to generate a suggestion pool of possible translations for each sentence in a document that comprises one or more sentences to be translated;
a translation module configured to provide a best suggestion from the suggestion pool to a user for a sentence being translated and to provide an updated best suggestion from the updated suggestion pool to the user for the sentence being translated after the receipt of a user's translation prefix input; and
a pool update module configured to update the suggestion pool based on the user's input of a translation prefix.

2. The system of claim 1, wherein the processor is further configured to use general and customized translation modles to generate the suggestion pool.

3. The system of claim 2, wherein the customized model is built using in-domain data for a domain of the document.

4. The system of claim 2, further a model update module configured to update customized translation model based on a completed sentence translation.

5. The system of claim 1, wherein the suggestion pool is a word lattice that includes a proper subset of possible translations having a likelihood above a threshold.

6. The system of claim 1, wherein the pool update module is further configured to removing suggestions that do not match the translation prefix.

7. The system of claim 1, further comprising:
a server, wherein the server comprises said processor and a communication module configured to transmit the suggestion pool; and
a client device, wherein the client device comprises said translation module, said pool update module, and a communication module configured to receive the suggestion pool and to transmit a request for additional possible translations based on the translation prefix if the prefix deviates from possible translations in the suggestion pool.

8. The system of claim 1, wherein the translation prefix comprises translation information entered manually by the user.

9. The system of claim 8, wherein the translation prefix comprises an accepted portion of the best suggestion.

10. The system of claim 1, wherein the suggestion pool of possible translations for each sentence comprises a pruned translation lattice for each sentence that compactly represents a set of possible phrase translations of a sentence being translated.

11. The system of claim 10, wherein the pool update module is further configured to add new likely translations and pruning translations that are not viable.

12. A non-transitory computer readable storage medium comprising a computer readable program for computer-aided translation, wherein the computer readable program when executed on a computer causes the computer to perform the steps of:
receiving a document comprising one or more sentences to be translated;
generating a suggestion pool of possible translations for each sentence in the document using a processor;
providing a best suggestion from the suggestion pool to a user for a sentence being translated;
updating the suggestion pool based on the user's input of a translation prefix; and
providing an updated best suggestion from the updated suggestion pool to the user for the sentence being translated.

* * * * *